US012746998B2

(12) United States Patent
Chung

(10) Patent No.: US 12,746,998 B2
(45) Date of Patent: Sep. 29, 2026

(54) METHOD AND SYSTEM FOR CONTROLLING ELECTRIC BICYCLE

(71) Applicant: HL MANDO CORPORATION, Gyeonggi-do (KR)

(72) Inventor: Hanbyul Chung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 527 days.

(21) Appl. No.: 18/232,360

(22) Filed: Aug. 10, 2023

(65) Prior Publication Data

US 2024/0417031 A1 Dec. 19, 2024

(30) Foreign Application Priority Data

Jun. 15, 2023 (KR) ........................ 10-2023-0076523

(51) Int. Cl.
*B62M 6/50* (2010.01)
*B62M 6/55* (2010.01)

(52) U.S. Cl.
CPC ................ *B62M 6/50* (2013.01); *B62M 6/55* (2013.01)

(58) Field of Classification Search
CPC ................................. B62M 6/50; B62M 6/55
See application file for complete search history.

(56) References Cited

U.S. PATENT DOCUMENTS 8,725,340 B1 * 5/2014 Hosaka .................. B60L 50/20 701/22
9,758,213 B2 9/2017 Kawakami
9,896,153 B2 * 2/2018 Tanaka ...................... B60L 7/26
11,543,821 B2 * 1/2023 Corbett ................ G05D 1/0088
2012/0012412 A1 1/2012 Moeller et al.
2014/0121877 A1 * 5/2014 Hosaka .................... B62M 6/45 701/22
2016/0121963 A1 * 5/2016 Tanaka ..................... B62M 6/90 701/22
2022/0063672 A1 * 3/2022 Corbett ............. B60W 60/0016
2022/0066448 A1 * 3/2022 Corbett .................... B62M 6/65
2022/0185427 A1 6/2022 Paick et al.
2022/0194520 A1 6/2022 Guzelgunler

FOREIGN PATENT DOCUMENTS

| | | |
|---|---|---|
| KR | 10-2012-0001834 | 1/2012 |
| KR | 10-1473180 | 12/2014 |
| KR | 10-1896022 | 9/2018 |
| WO | 2018/199773 | 11/2018 |

OTHER PUBLICATIONS

Extended European Search Report dated Jan. 23, 2024 for European Patent Application No. 23191126.4.

* cited by examiner

*Primary Examiner* — Valentin Neacsu
*Assistant Examiner* — Michael R Stabley
(74) *Attorney, Agent, or Firm* — WOMBLE BOND DICKINSON (US) LLP

(57) ABSTRACT

A method and system for controlling an electric bicycle are provided. The method may comprise: driving the electric bicycle; generating a deceleration torque command of a driving motor based on a moving distance of a pedal if a driver rotates the pedal installed in the electric bicycle in a reverse direction while the electric bicycle is driving; controlling a current supplied to the driving motor according to the deceleration torque command; and generating a deceleration torque of the driving motor by the current control.

18 Claims, 6 Drawing Sheets

METHOD AND SYSTEM FOR CONTROLLING ELECTRIC BICYCLE

CROSS-REFERENCE TO RELATED APPLICATION

This application claims the benefit of and priority to Korean Patent Application No. 2023-0076523 filed on Jun. 15, 2023, the entire disclosures of which are incorporated herein by reference.

TECHNICAL FIELD

The present disclosure generally relates to a method and system for controlling an electric bicycle. More specifically, the present disclosure relates to a method and system for controlling an electric bicycle driven electrically without a chain.

BACKGROUND

Recently, interest in electric bicycles increases, and various methods and systems for driving electric bicycles are being developed. In particular, in a chainless electric bicycle, a pedal motor and a driving motor are controlled to create a pedal feeling so that the driver feels the same pedal feeling as riding a bicycle having a chain.

In general, in such a chainless electric bicycle, acceleration by driving a motor is performed by rotating a pedal in a forward direction, and braking force is generated by allowing a mechanical brake to hold a wheel by operating a brake lever.

On the other hand, an electric bicycle control technology for performing deceleration control by reversely rotating a pedal other than operating a brake lever has also been developed. U.S. Pat. No. 9,758,213 discloses a configuration in which deceleration control is performed by operating a coaster brake provided on a rear wheel when the pedal is rotated in a reverse direction in an electric assist bicycle.

However, in the case of an electric bicycle according to the prior art, a separate device called a coaster brake is required for braking control when the pedal is rotated reversely, and additional parts for mounting the coaster brake on the bicycle are also required, which causes to a problem that the configuration of the device becomes very complicated.

Therefore, there is a need for a method and system for controlling an electric bicycle that minimizes necessary parts and allows a driver to conveniently accelerate and decelerate the electric bicycle.

PRIOR ART DOCUMENT (Patent Document) U.S. Pat. No. 9,758,213 (2017 Aug. 12.)

SUMMARY

The present disclosure is to solve the above-mentioned problems of the prior art, and the object of the present disclosure is to provide a method and system for controlling an electric bicycle that provides braking force by generating a deceleration torque based on a moving distance of a pedal if a driver rotates the pedal in a reverse direction.

However, the technical problem to be achieved by the embodiments of the present disclosure is not limited to the technical problems described above, and other technical problems may exist.

As a technical means for achieving the above technical problem, a method for controlling an electric bicycle according to an embodiment of the present disclosure method comprises: driving the electric bicycle; generating a deceleration torque command of a driving motor based on a moving distance of a pedal if a driver rotates the pedal installed in the electric bicycle in a reverse direction while the electric bicycle is driving; controlling a current supplied to the driving motor according to the deceleration torque command; and generating a deceleration torque of the driving motor by the current control.

Further, a magnitude of the deceleration torque of the driving motor may be proportional to the moving distance of the pedal.

Further, if the driver rotates the pedal installed in the electric bicycle in the reverse direction, the driving motor may generate electrical energy by regenerative braking and the current supplied to the driving motor may be controlled by using the generated electrical energy.

Further, the electrical energy generated by the regenerative braking may be charged in a battery mounted at the electric bicycle.

The method may further comprise generating a deceleration pedal torque command of a pedal motor based on the generated deceleration torque of the driving motor.

The method may further comprise: controlling a current supplied to the pedal motor according to the generated deceleration pedal torque command; and generating a deceleration pedal torque to generate a pedal feeling by generating a pedal torque in a direction opposite to a rotational direction of the pedal by the current control.

Further, driving the electric bicycle may comprise: generating an acceleration torque command of the driving motor based on a rotating speed of the pedal and a gear ratio of a gearshift as the driver rotates the pedal in a forward direction.

Further, driving the electric bicycle may further comprise: controlling a current supplied to the driving motor according to the acceleration torque command; and generating an acceleration torque of the driving motor by the current control.

Further, driving the electric bicycle may further comprise: generating an acceleration pedal torque command of a pedal motor based on the generated acceleration torque of the driving motor.

Further, driving the electric bicycle may further comprise: controlling a current supplied to the pedal motor according to the generated acceleration pedal torque command; and generating an acceleration pedal torque to generate a pedal feeling by generating a pedal torque in a direction opposite to a rotational direction of the pedal by the current control.

A system for controlling an electric bicycle according to an embodiment of the present disclosure comprises: a pedal motor comprising a pedal motor controller; a driving motor comprising a driving motor controller; and a system controller configured to control the system, wherein the system controller comprises a deceleration torque command generation unit, and if a driver rotates a pedal installed in the electric bicycle in a reverse direction while the electric bicycle is driving, the deceleration torque command generation unit generates a deceleration torque command of the driving motor based on a moving distance of the pedal, and wherein the driving motor controller controls a current supplied to the driving motor according to the deceleration torque command, and a deceleration torque of the driving motor is generated by the current control.

Further, a magnitude of the generated deceleration torque of the driving motor may be proportional to the moving distance of the pedal.

The system may further comprise a battery configured to charge electrical energy, wherein if the driver rotates the pedal installed in the electric bicycle in the reverse direction, the driving motor may generate electrical energy by regenerative braking, and the generated electrical energy may be charged in the battery.

Further, the system controller may further comprise a pedal torque command generation unit, and the pedal torque command generation unit may generate a deceleration pedal torque command of the pedal motor based on the generated deceleration torque of the driving motor.

Further, the pedal motor controller may control a current supplied to the pedal motor according to the generated deceleration pedal torque command, and a pedal torque may be generated in a direction opposite to a rotational direction of the pedal by the current control to generate a pedal feeling.

Further, the system controller may comprise an acceleration torque command generation unit, and the acceleration torque command generation unit may generate an acceleration torque command of the driving motor based on a rotating speed of the pedal and a gear ratio of a gearshift when the driver rotates the pedal in a forward direction.

Further, the driving motor controller may control a current supplied to the driving motor according to the acceleration torque command, and an acceleration torque of the driving motor may be generated by the current control.

Further, the system controller may further comprise a pedal torque command generation unit, and the pedal torque command generation unit may generate an acceleration pedal torque command of the pedal motor based on the generated acceleration torque of the driving motor.

Further, the pedal motor controller may control a current supplied to the pedal motor according to the generated acceleration pedal torque command, and pedal torque may be generated in a direction opposite to a rotational direction of the pedal by the current control to generate a pedal feeling.

The system may further comprise an interface comprising a display, wherein if the driver operates a button on the interface, the gear ratio of the gearshift or a magnitude of a braking force is determined.

The above-described means for solving the problem is only exemplary and should not be construed as limiting the present disclosure. In addition to the exemplary embodiments described above, additional embodiments may exist in the drawings and detailed description of the present disclosure.

According to the above-described problem-solving means of the present disclosure, if the driver rotates the pedal in the reverse direction, the deceleration (braking) torque of the driving motor is generated according to the moving distance of the pedal. Accordingly, it is possible to provide a method and system for controlling the electric bicycle capable of improving the convenience of braking control, with the structure being simplified compared to conventional electric bicycles.

However, the effects obtainable from the present disclosure are not limited to the effects described above, and other effects may exist.

DETAILED DESCRIPTION

Figure 1:
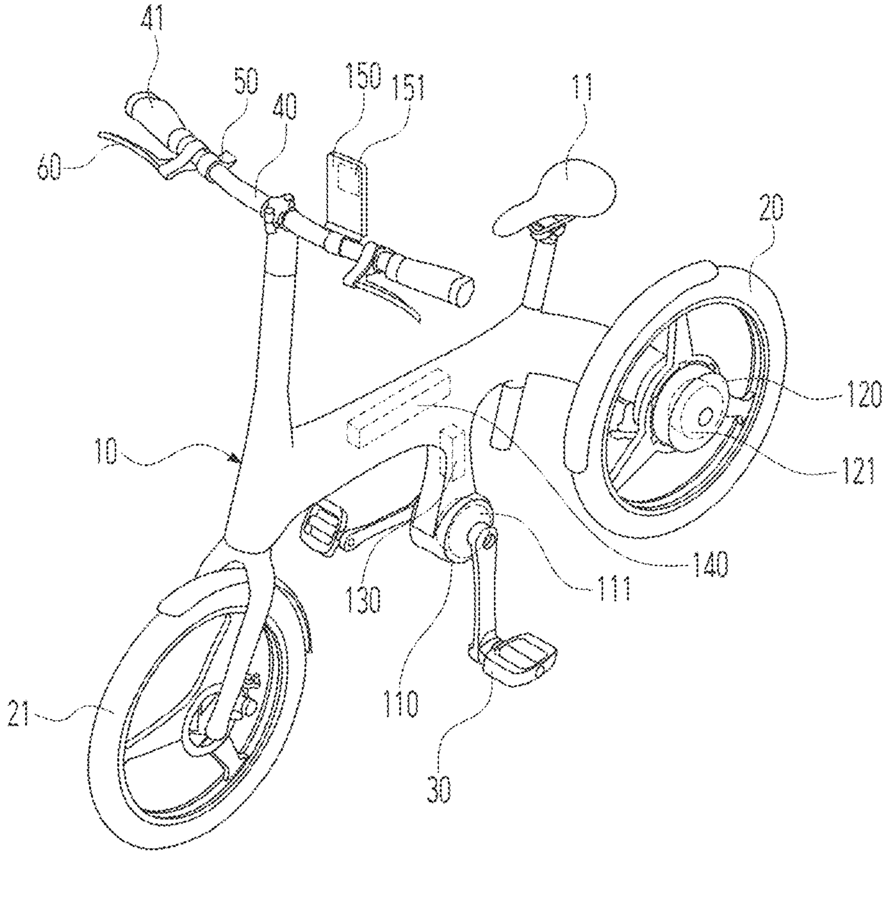
FIG. 1 is a perspective view schematically showing an electric bicycle according to an embodiment of the present disclosure.

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a method and system for controlling an electric bicycle that performs braking control by generating a deceleration torque of a driving motor based on a moving distance of a pedal when the pedal is rotated in a reverse direction in the electric bicycle driven without a chain.

FIG. 1 is a perspective view schematically showing an electric bicycle according to an embodiment of the present disclosure.

An electric bicycle 1 according to the embodiment of the present disclosure may include a frame 10 for constituting a body of the electric bicycle, a pedal motor (generator) 110 including a pedal motor controller 111 for driving a pedal 30, a driving motor 120 including a driving motor controller 121 for driving a wheel 20, and a system controller 130 for controlling the system.

A saddle 11 connected to a frame 10 may be provided for a user to ride on, and wheels 20 and 21 may be provided at the rear and front of the frame 10, respectively. In the example of FIG. 1, it is shown that two wheels 20 and 21 are installed, but the present disclosure is not limited thereto, and the number of wheels may be changed as needed.

Further, although a configuration in which the driving motor 120 is provided at the rear wheel 20 is illustrated in FIG. 1, it is not limited thereto, and the driving motor(s) may be provided at one of the wheels 20 and 21 or at both of the wheels 20 and 21. In addition, if the electric bicycle has three or four wheels, the driving motor(s) may be provided at at least one of the three or four wheels.

The pedal 30 may be rotatably mounted at both sides of the pedal motor 110, and the rotational force of the pedal 30 may be converted into electrical energy in the pedal motor 110 as a generator and the electrical force may be charged in a battery 140 provided in the frame 10.

Further, a handlebar 40 for steering the electric bicycle 1 may be provided on the upper part of the front part of the frame 10. In addition, a handle 41 provided at an end portion, a brake lever 60 for decelerating or stopping the electric bicycle, and a throttle 50 for driving the driving motor 120 may be provided at the handlebar 40.

The brake lever 60 may be electrically connected to the driving motor 120, and when the driver operates the brake lever 60, a brake operation signal may be transmitted to the driving motor, and the braking force may be generated by regenerative braking of the driving motor.

Meanwhile, an interface (Human Machine Interface; HMI) 150 including a display may be installed on the handlebar 40, and the interface 150 may include a button unit 151 to be operated by a driver. By operating the button unit 151, the driver may determine the gear ratio of the gearshift to shift gears or may determine the magnitude of the braking force to control the braking force of the electric bicycle. The button unit 151 may be a touch type button unit capable of being touched on a display, and a plurality of buttons may be provided at the button unit 151.

A saddle 11 for a driver to ride may be installed on the frame 10, and the driver may ride on the saddle 11 and drive the electric bicycle 1 by driving the pedal 30 with his/her foot or operating the throttle 50 with his/her hand.

Figure 2:
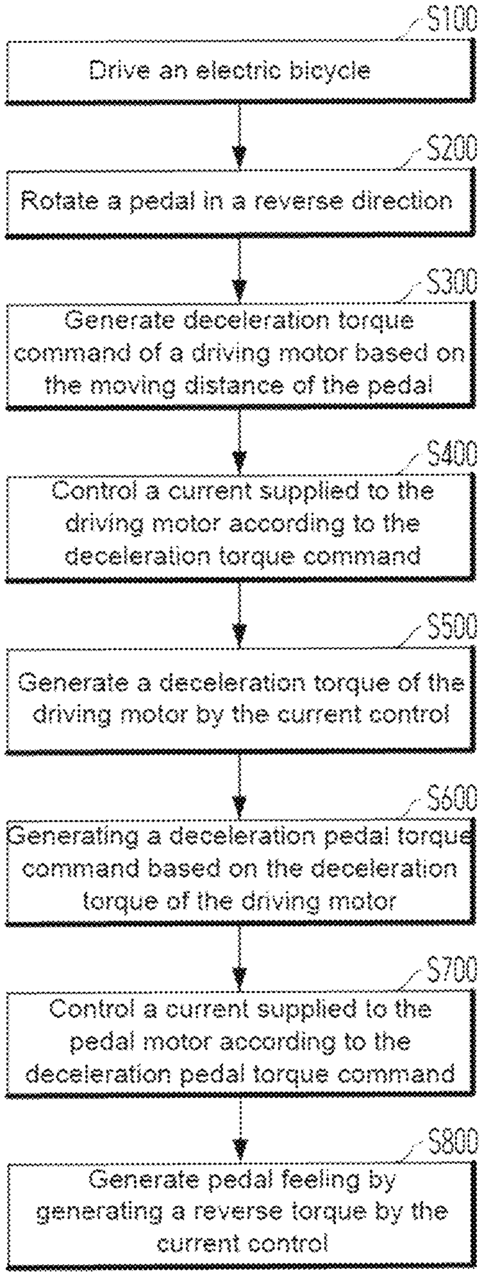
FIG. 2 is a flowchart illustrating a deceleration control by rotating a pedal in a reverse direction in a method for controlling the electric bicycle according to the embodiment of the present disclosure.

FIG. 2 is a flowchart illustrating a deceleration control by rotating a pedal in a reverse direction in a method for controlling the electric bicycle according to the embodiment of the present disclosure.

Referring to FIG. 2, in the method for controlling the electric bicycle according to the embodiment of the present disclosure, driving the electric bicycle may be performed S100. Further, if the driver rotates the pedal in the reverse direction while the electric bicycle is driving S200, generating a deceleration torque command of the driving motor based on the moving distance of the pedal may be performed S300. This deceleration torque command may be transmitted from a system controller that controls the entire system.

If the deceleration torque command of the driving motor is generated, controlling a current of the driving motor according to the generated deceleration torque command may be performed S400. This current control of the driving motor may be performed by a driving motor controller in the driving motor.

Further, generating a deceleration torque of the driving motor by the current control of the driving motor may be performed S500. That is, a deceleration torque for generating a braking force in the driving motor may be generated by controlling the current such that a force is applied in a direction opposite to the rotational direction of the driving motor. Accordingly, the speed of the wheel mechanically connected to the driving motor may be controlled so that the electric bicycle can be decelerated.

The magnitude of the deceleration torque (braking force) of the driving motor may be proportional to the moving distance (moving angle) of the pedal rotated in the reverse direction by the driver. For example, the magnitude of the deceleration torque (braking torque) (T) may be calculated as a value obtained by multiplying the moving distance (d) of the pedal measured from the pedal sensor unit by the proportional constant ($\alpha$).

As described above, if the driver rotates the pedal installed in the electric bicycle in the reverse direction, the braking force generated by the driving motor may be the braking force generated by regenerative braking. Specifically, when the pedal rotates in the reverse direction, the driving motor may generate electrical energy by regenerative braking to generate braking force, and when the braking force is generated by regenerative braking, the generated electrical energy may be charged in a battery installed in the electric bicycle.

Based on the deceleration torque of the driving motor generated as described above, generating a deceleration pedal torque command of the pedal motor may be performed S600. The deceleration pedal torque command may be transmitted from a system controller that controls the entire system.

If the deceleration pedal torque command of the pedal motor is generated, controlling the current of the pedal motor according to the generated deceleration pedal torque command may be performed S700. This current control of the pedal motor may be performed by a pedal motor controller in the pedal motor.

Subsequently, generating a deceleration pedal torque to generate a pedal feeling by generating a pedal torque in a direction opposite to a rotational direction of the pedal by the current control of the pedal motor may be performed S800. That is, in generating the deceleration pedal torque, the driver can feel the pedal feeling by generating the reverse torque applied in the opposite direction (forward direction) to the reverse direction in which the driver rotates the pedal.

Figure 3:
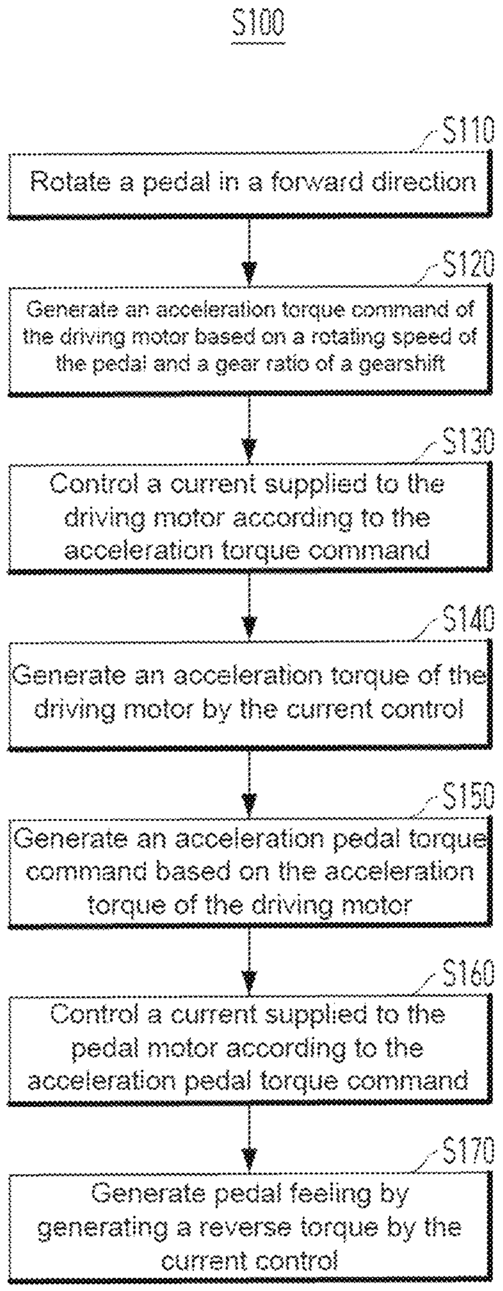
FIG. 3 is a flowchart illustrating an acceleration control by rotating the pedal in a forward direction in driving the electric bicycle in the method for controlling the electric bicycle according to the embodiment of the present disclosure.

FIG. 3 is a flowchart illustrating an acceleration control by rotating the pedal in a forward direction in driving the electric bicycle in the method for controlling the electric bicycle according to the embodiment of the present disclosure.

Referring to FIG. 3, in driving the electric bicycle S100 in the method for controlling the electric bicycle according to the embodiment of the present disclosure, if the driver rotates the pedal in the forward direction while driving the electric bicycle S110, generating an acceleration torque command of the driving motor based on the rotational speed of the pedal and the gear ratio of the gearshift may be performed S120. This acceleration torque command may be transmitted from a system controller that controls the entire system.

If the acceleration torque command of the driving motor is generated, controlling the current of the driving motor according to the generated acceleration torque command may be performed S130. This current control of the driving motor may be performed by a driving motor controller in the driving motor.

Further, generating acceleration torque of the driving motor by a current control of the driving motor may be performed S140. That is, an acceleration torque may be generated to increase the speed of the driving motor by increasing the current flowing through the driving motor. Accordingly, the speed of the wheel mechanically connected to the driving motor is controlled so that the electric bicycle can be accelerated.

Based on the generated acceleration torque of the driving motor, generating an acceleration pedal torque command of the pedal motor may be performed S150. This acceleration pedal torque command may be transmitted from a system controller that controls the entire system.

If the acceleration torque command of the pedal motor is generated, controlling the current of the pedal motor according to the generated acceleration pedal torque command may be performed S160. This current control of the pedal motor can be performed by a pedal motor controller within the pedal motor.

Subsequently, generating an acceleration pedal torque to generate a pedal feeling by generating a pedal torque in a direction opposite to a rotational direction of the pedal by the current control of the pedal motor may be performed S170. That is, in generating the acceleration pedal torque, the driver can feel the pedal feeling as if there is a chain by generating the reverse torque applied in the opposite direction (reverse direction) to the forward direction in which the driver rotates the pedal.

As described above, according to method for controlling the electric bicycle according to the embodiment of the present disclosure, if the driver rotates the pedal in a forward or a reverse direction while the electric bicycle is driving, a pedal torque is generated in a direction opposite to the direction in which the pedal is rotated. As a result, the driver can feel a comfortable pedal feeling while driving.

In addition, if the driver rotates the pedal in the reverse direction while driving the electric bicycle, a braking force can be generated by generating the deceleration torque of the driving motor which is proportional to the moving distance of the pedal. Therefore, it is possible to effectively perform the braking control of the electric bicycle by reversely rotating the pedal without a separate device such as the coaster brake.

Figure 4:
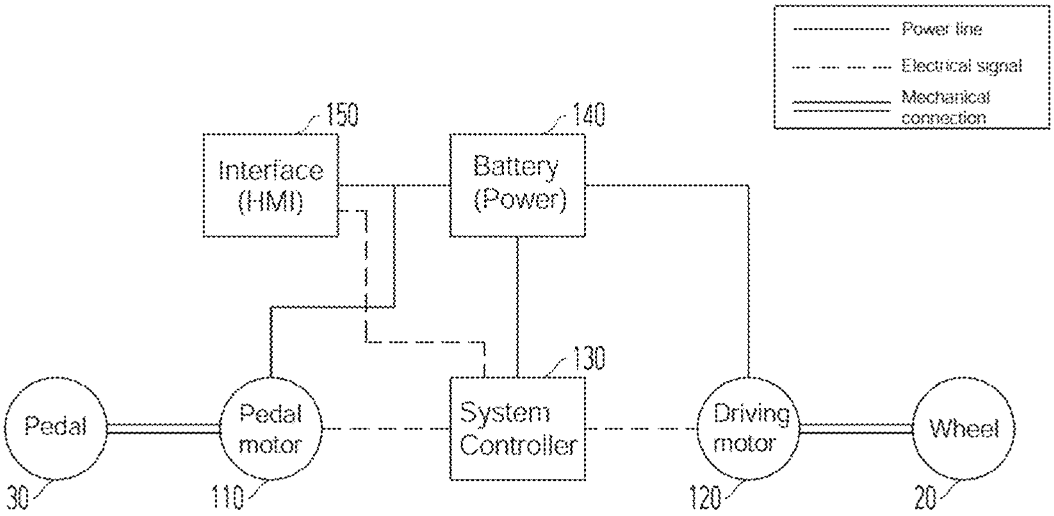
FIG. 4 is a block diagram illustrating a connection relationship between components of the electric bicycle according to the embodiment of the present disclosure.

FIG. 4 is a block diagram illustrating a connection relationship between components of the electric bicycle according to the embodiment of the present disclosure.

Referring to FIG. 4, the system controller 130 may be connected to the interface (HMI) 150, a pedal motor 110, and a driving motor 120 through electrical signals (communication), the system controller 130 may be connected to the battery (power source) 140 through a power line.

In addition, the pedal motor 110 may be mechanically connected to the pedal 30, and the driving motor 120 may be mechanically connected to the wheel 20.

The pedal motor 110 may be connected to the interface 150 and the battery 140 through power lines, and the driving motor 120 may be connected to the battery 140 through a power line.

Figure 5:
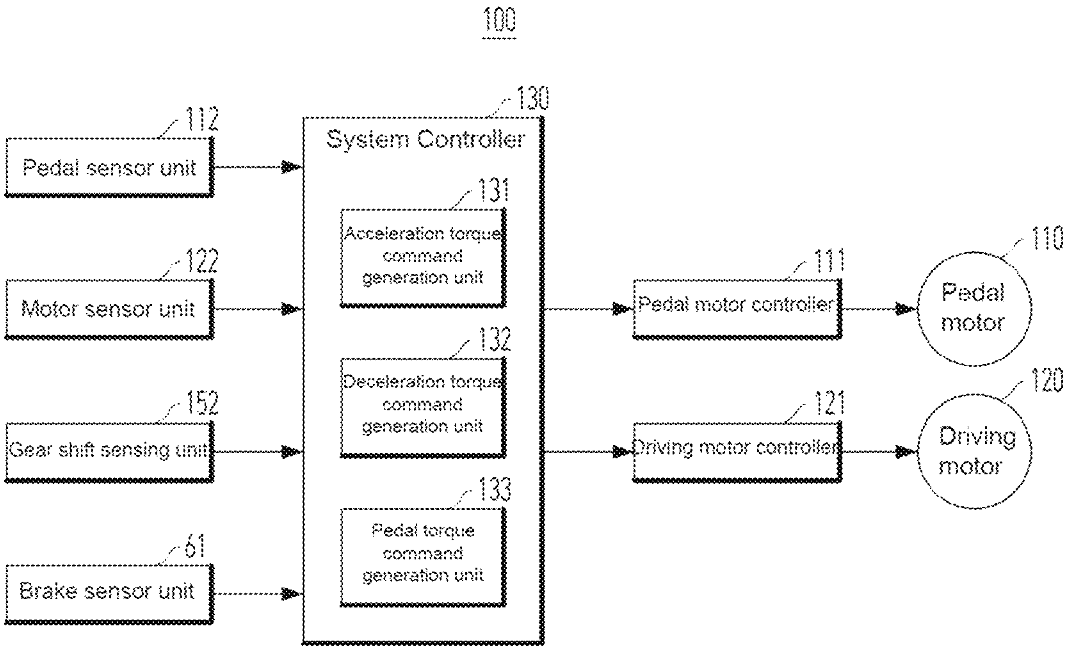
FIG. 5 is a control block diagram schematically illustrating a system for controlling the electric bicycle according to the embodiment of the present disclosure.

FIG. 5 is a control block diagram schematically illustrating a system for controlling the electric bicycle according to the embodiment of the present disclosure.

Referring to FIG. 5, the system for controlling the electric bicycle 100 according to the embodiment of the present disclosure may include a pedal motor 110, a pedal motor controller 111 for controlling the pedal motor, a driving motor 120, a driving motor controller 121 for controlling the driving motor, and a system controller 130 for controlling the system.

In addition, the system controller 130 may include an acceleration torque command generation unit 131, a deceleration torque command generation unit 132, and a pedal torque command generation unit 133.

Further, the system for controlling the electric bicycle 100 according to the embodiment of the present disclosure may include a pedal sensor unit 112 configured to detect a position and/or a speed of the pedal, a motor sensor unit 122 configured to detect a position and/or a speed of the motor, a gear shift sensing unit 152 configured to detect gear shifting of the electric bicycle. In addition, the system for controlling the electric bicycle 100 according to the embodiment of the present disclosure may include a brake sensor unit 61 configured to detect an operation of the brake lever.

The gear shift sensing unit 152 may detect gear shifting of the electric bicycle by detecting the driver's operation of the button unit 151 provided on the interface 150 to shift gears.

According to the system for controlling the electric bicycle 100 as described above, if the driver rotates a pedal, the pedal sensor unit 112 may detect the position and/or speed of the pedal. If the driver rotates the pedal in the forward direction while driving of the electric bicycle, the system controller 130 may generate the acceleration torque command of the driving motor in the acceleration torque command generation unit 131 based on the rotational speed of the pedal detected by the pedal sensor unit 112 and the gear shift detected by the gear shift sensing unit 152.

Further, the acceleration torque command generation unit 131 may transmit the generated acceleration torque command to the driving motor controller 121 to control the current supplied to the driving motor 120, thereby generating the acceleration torque of the driving motor 120. The speed of the wheel may be controlled by this acceleration torque, so that the electric bicycle can be accelerated.

Subsequently, the generated acceleration torque of the driving motor may be detected by the motor sensor unit 122, and based on this, the pedal torque command generation unit 133 of the system controller 130 may generate a pedal torque command of the pedal motor to transmit the acceleration pedal torque command to the motor controller 111.

The pedal motor controller 111 may control the current supplied to the pedal motor 110 according to the generated acceleration pedal torque command, thereby generating the pedal feeling by generating the pedal torque in a direction opposite to the rotational direction (forward direction) of the pedal.

If the driver rotates the pedal in the reverse direction, the pedal sensor unit 112 may detect the moving distance of the pedal rotated in the reverse direction. The system controller 130 may generate a deceleration torque command in the deceleration torque command generation unit 132 based on the moving distance of the pedal detected by the pedal sensor unit 112.

In addition, the deceleration torque command generation unit 132 may transmit the generated deceleration torque command to the driving motor controller 121 to control the current supplied to the driving motor 120, thereby generating the deceleration torque of the driving motor 120. The value of the deceleration torque of the driving motor may be a value proportional to the detected pedal travel distance, and specifically, a value calculated by multiplying the moving distance (d) of the pedal measured from the pedal sensor unit 112 by the proportional constant ($\alpha$).

On the other hand, the proportional constant ($\alpha$) may be determined by the driver's selection, and for example, the value of the proportional constant ($\alpha$) may be determined by operating the button unit 151 provided in the interface 150 by the driver. Accordingly, the value of the deceleration torque (braking force) of the driving motor, which is a value obtained by multiplying the moving distance (d) of the pedal by the proportionality constant ($\alpha$), may be determined.

The electric bicycle may be decelerated (stopped) by controlling the speed of the wheel mechanically connected to the driving motor by the deceleration torque of the driving motor.

Subsequently, the generated deceleration torque of the driving motor may be detected by the motor sensor unit 122, and based on this, the pedal torque command generation unit 133 of the system controller 130 may transmit the deceleration pedal torque command to the pedal motor controller 111 by generating the pedal torque command.

The pedal motor controller 111 may control the current supplied to the pedal motor 110 according to the generated deceleration pedal torque command, thereby generating the pedal feeling by generating the pedal torque in an opposite direction to the rotational direction (reverse direction) of the pedal.

As described above, according to one embodiment of the present application, if the pedal is rotated in the reverse direction, the braking control by regenerative braking can be performed by generating the deceleration torque of the motor which is proportional to the moving distance of the pedal. Accordingly, when generating the braking force by reversely rotating the pedal, it is possible to conveniently perform the braking control without an additional device.

Meanwhile, if the brake lever 60 installed in the electric bicycle is operated, the system for controlling the electric bicycle 100 may detect a brake operation signal from the brake sensor unit 61 and control the current of the driving motor to generate the braking force (deceleration torque). That is, in performing the braking control of the electric bicycle, the driver can perform the braking control by regenerative braking by operating the brake lever or by rotating the pedal in the reverse direction.

Figure 6:
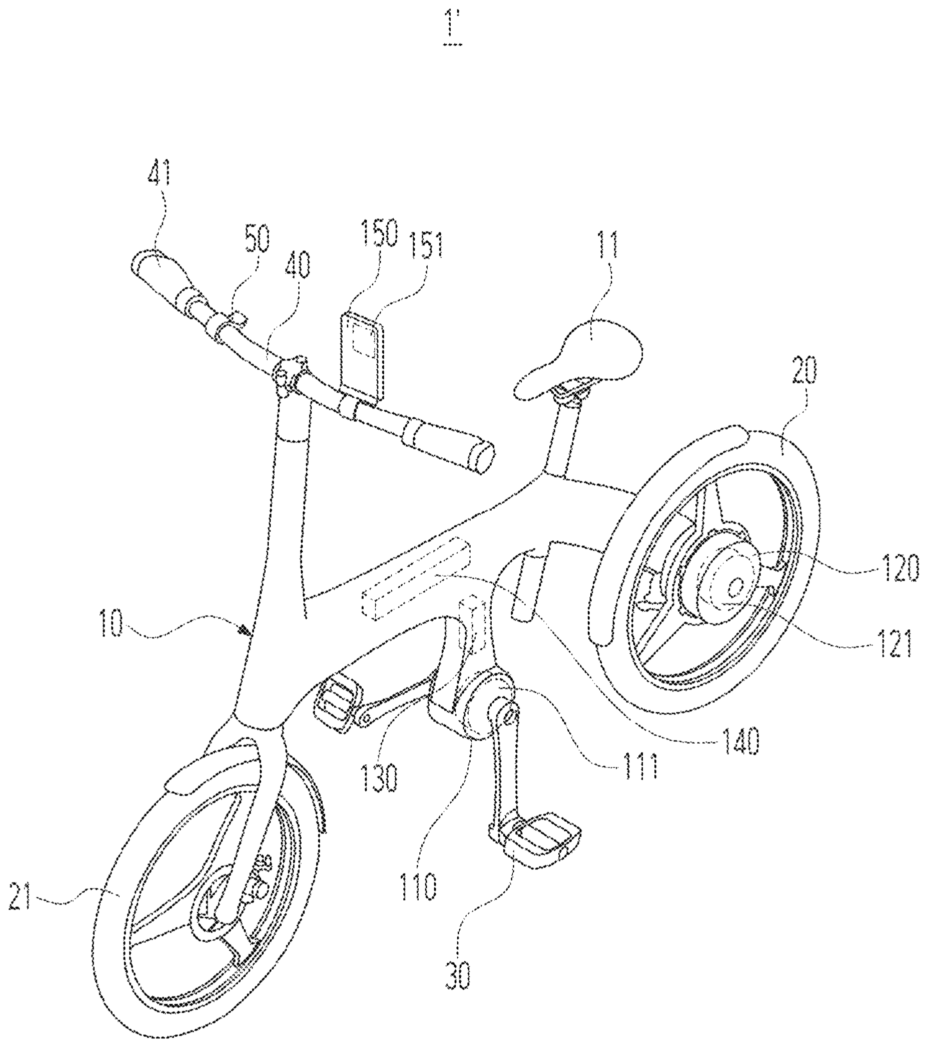
FIG. 6 is a perspective view schematically illustrating an electric bicycle according to another exemplary embodiment of the present disclosure.

FIG. 6 is a perspective view schematically illustrating an electric bicycle according to another exemplary embodiment of the present disclosure.

FIG. 6 shows a configuration of an electric bicycle in which the brake lever and related devices are omitted from the electric bicycle illustrated in FIG. 1.

As shown in FIG. 6, since the electric bicycle according to another embodiment of the present disclosure does not include a brake lever, braking control can be performed only by rotating the pedal in a reverse direction.

With this configuration, it is possible to simplify the configuration of the electric bicycle, in that the electric bicycle can be configured without any separate braking device such as the brake lever.

According to the embodiment of the present disclosure as described above, it is possible to provide a method and system for controlling the electric bicycle capable of driving and braking the electric bicycle without a chain, and also capable of providing a pedal feeling as if there is a chain.

Further, according to the present disclosure, it is possible to generate the braking torque proportional to the moving distance of the reversely rotating pedal through the control of the pedal motor and the driving motor by the system controller, and to easily perform the braking control without a separate device such as a coaster brake. In addition, since the braking control is possible by reversely rotating the pedal, it is possible to simplify the configuration of the electric bicycle by omitting the brake lever.

Moreover, according to an embodiment of the present disclosure, it is possible to provide a method and system for controlling the electric bicycle capable of efficiently using the energy by recovering the kinetic energy as the electric energy through the regenerative braking.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

1, 1': Electric bicycle
10: Frame
11: Saddle
20, 21: Wheel
30: Pedal
40: Handlebar
41: Handle
50: Throttle
60: Brake lever
61: Brake sensor unit
100: Control system
110: Pedal motor (generator)
111: Pedal motor controller
112: Pedal sensor unit
120: Driving motor
121: Driving motor controller
122: Motor sensor unit
130: System controller
131: Acceleration torque command generation unit
132: Deceleration torque command generation unit
133: Pedal torque command generation unit
140: Battery
150: Interface
151: Button unit
152: Gear shift sensing unit

What is claimed is:

1. A method for controlling an electric bicycle, comprising:
- driving the electric bicycle;
- generating a deceleration torque command of a driving motor based on a moving distance of a pedal in response to a driver rotating the pedal installed in the electric bicycle in a reverse direction while the electric bicycle is driving;
- controlling a current supplied to the driving motor according to the deceleration torque command;
- generating a deceleration torque of the driving motor; and
- generating a deceleration pedal torque command of a pedal motor based on the generated deceleration torque of the driving motor.

2. The method of claim 1, wherein a magnitude of the deceleration torque of the driving motor is proportional to the moving distance of the pedal.

3. The method of claim 1, wherein in response to the driver rotating the pedal installed in the electric bicycle in the reverse direction, the driving motor generates electrical energy by regenerative braking and the current supplied to the driving motor is controlled by using the generated electrical energy.

4. The method of claim 3, wherein the electrical energy generated by the regenerative braking is charged in a battery mounted at the electric bicycle.

5. The method of claim 1, further comprising:

controlling a current supplied to the pedal motor according to the generated deceleration pedal torque command; and generating a deceleration pedal torque to generate a pedal feeling by generating a pedal torque in a direction opposite to a rotational direction of the pedal by a current control.

6. The method of claim 1, wherein driving the electric bicycle comprises:

generating an acceleration torque command of the driving motor based on a rotating speed of the pedal and a gear ratio of a gearshift as the driver rotates the pedal in a forward direction.

7. The method of claim 6, wherein driving the electric bicycle further comprises:

controlling a current supplied to the driving motor according to the acceleration torque command; and generating an acceleration torque of the driving motor by a current control.

8. The method of claim 7, wherein driving the electric bicycle further comprises:

generating an acceleration pedal torque command of a pedal motor based on the generated acceleration torque of the driving motor.

9. The method of claim 8, wherein driving the electric bicycle further comprises:

controlling a current supplied to the pedal motor according to the generated acceleration pedal torque command; and generating an acceleration pedal torque to generate a pedal feeling by generating a pedal torque in a direction opposite to a rotational direction of the pedal by the current control.

10. A system for controlling an electric bicycle, comprising:

a pedal motor comprising a pedal motor controller;

a driving motor comprising a driving motor controller; and a system controller configured to control the system, wherein the system controller comprises a deceleration torque command generation unit and a pedal torque command generation unit, and in response to a driver rotating a pedal installed in the electric bicycle in a reverse direction while the electric bicycle is driving, the deceleration torque command generation unit is configured to generate a deceleration torque command of the driving motor based on a moving distance of the pedal, and wherein the driving motor controller is configured to control a current supplied to the driving motor according to the deceleration torque command to generate a deceleration torque of the driving motor, and the pedal torque command generation unit is configured to generate a deceleration pedal torque command of the pedal motor based on the generated deceleration torque of the driving motor.

11. The system of claim 10, wherein a magnitude of the generated deceleration torque of the driving motor is proportional to the moving distance of the pedal.

12. The system of claim 10, further comprising a battery configured to charge electrical energy, wherein in response to the driver rotating the pedal installed in the electric bicycle in the reverse direction, the driving motor is configured to generate electrical energy by regenerative braking, and the generated electrical energy is charged in the battery.

13. The system of claim 10, wherein the pedal motor controller is configure to control a current supplied to the pedal motor according to the generated deceleration pedal torque command to generate a pedal torque in a direction opposite to a rotational direction of the pedal and generate a pedal feeling.

14. The system of claim 10, wherein the system controller comprises an acceleration torque command generation unit, and the acceleration torque command generation unit generates an acceleration torque command of the driving motor based on a rotating speed of the pedal and a gear ratio of a gearshift when the driver rotates the pedal in a forward direction.

15. The system of claim 14, wherein the driving motor controller controls a current supplied to the driving motor according to the acceleration torque command, and an acceleration torque of the driving motor is generated by a current control.

16. The system of claim 15, wherein the system controller further comprises a pedal torque command generation unit, and the pedal torque command generation unit generates an acceleration pedal torque command of the pedal motor based on the generated acceleration torque of the driving motor.

17. The system of claim 16, wherein the pedal motor controller is configured to control a current supplied to the pedal motor according to the generated acceleration pedal torque command to generate pedal torque in a direction opposite to a rotational direction of the pedal and generate a pedal feeling.

18. The system of claim 14, further comprising an interface comprising a display, wherein in response to the driver operating a button on the interface, the gear ratio of the gearshift or a magnitude of a braking force is determined.

* * * * *